Jan. 31, 1950 — R. A. FARRELL — 2,496,043
LEAKPROOF PACKAGE AND METHOD OF MAKING SAME
Filed July 26, 1946 — 6 Sheets-Sheet 1
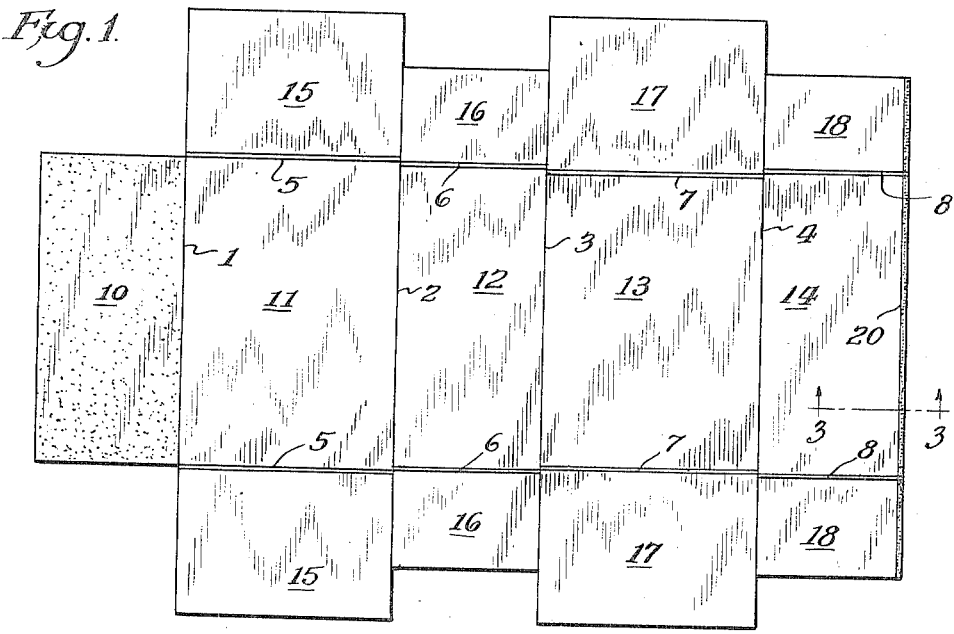
Fig. 1.
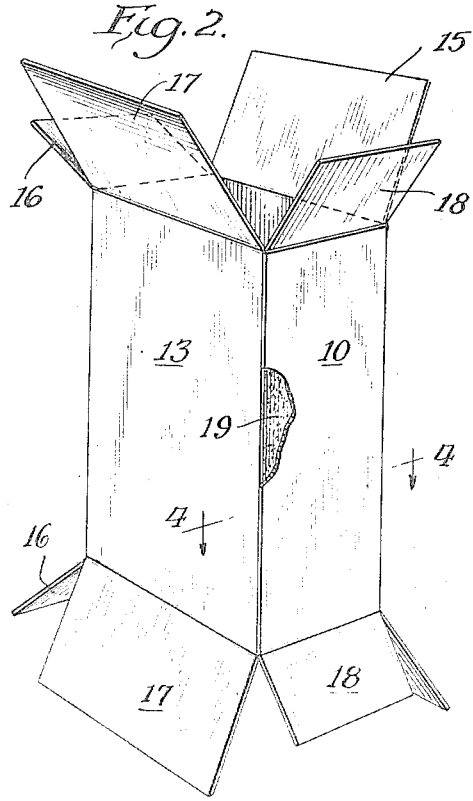
Fig. 2.
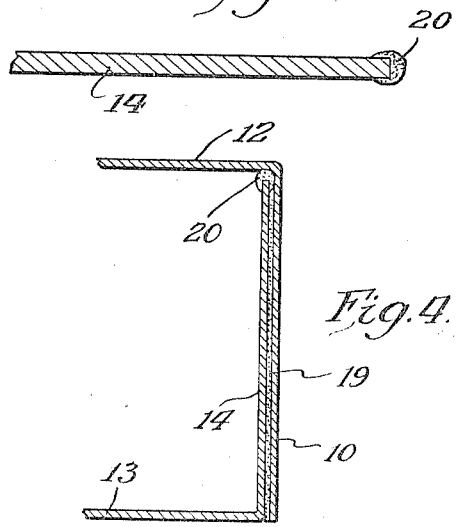
Fig. 3.
Fig. 4.
Inventor
Robert A. Farrell
By Joseph Rossman
Atty Jan. 31, 1950 R. A. FARRELL 2,496,043
LEAKPROOF PACKAGE AND METHOD OF MAKING SAME
Filed July 26, 1946 6 Sheets-Sheet 2
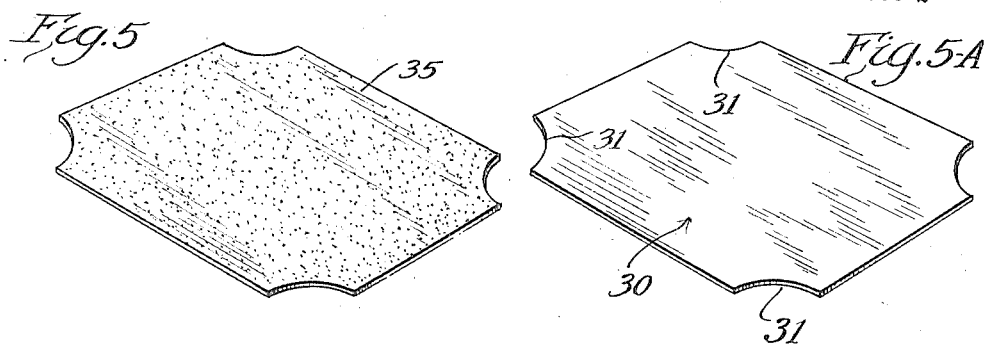
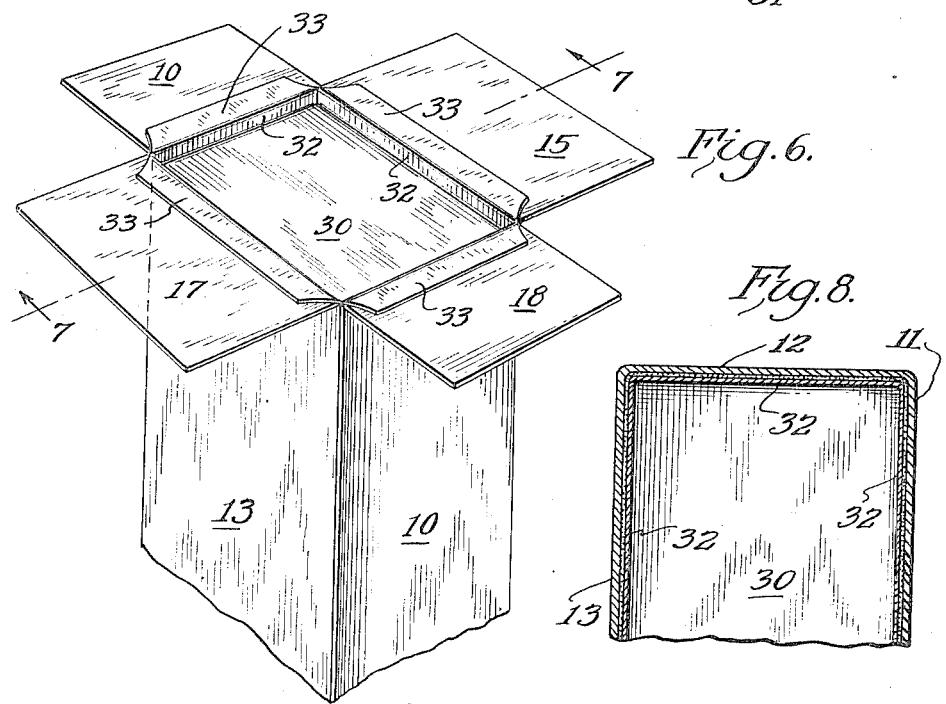
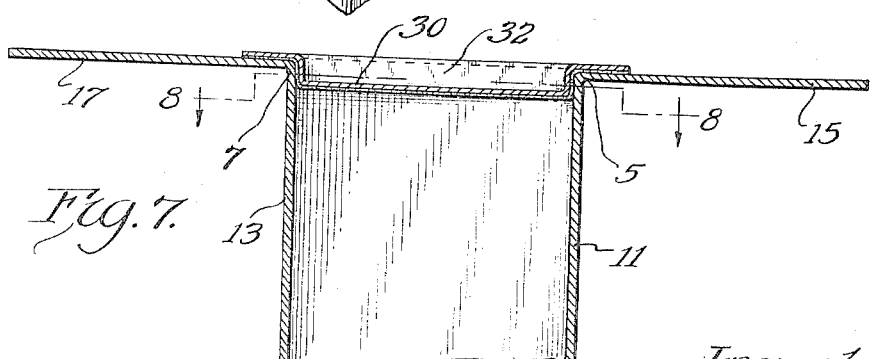
Inventor
Robert A. Farrell
By Joseph Rossman
Atty.

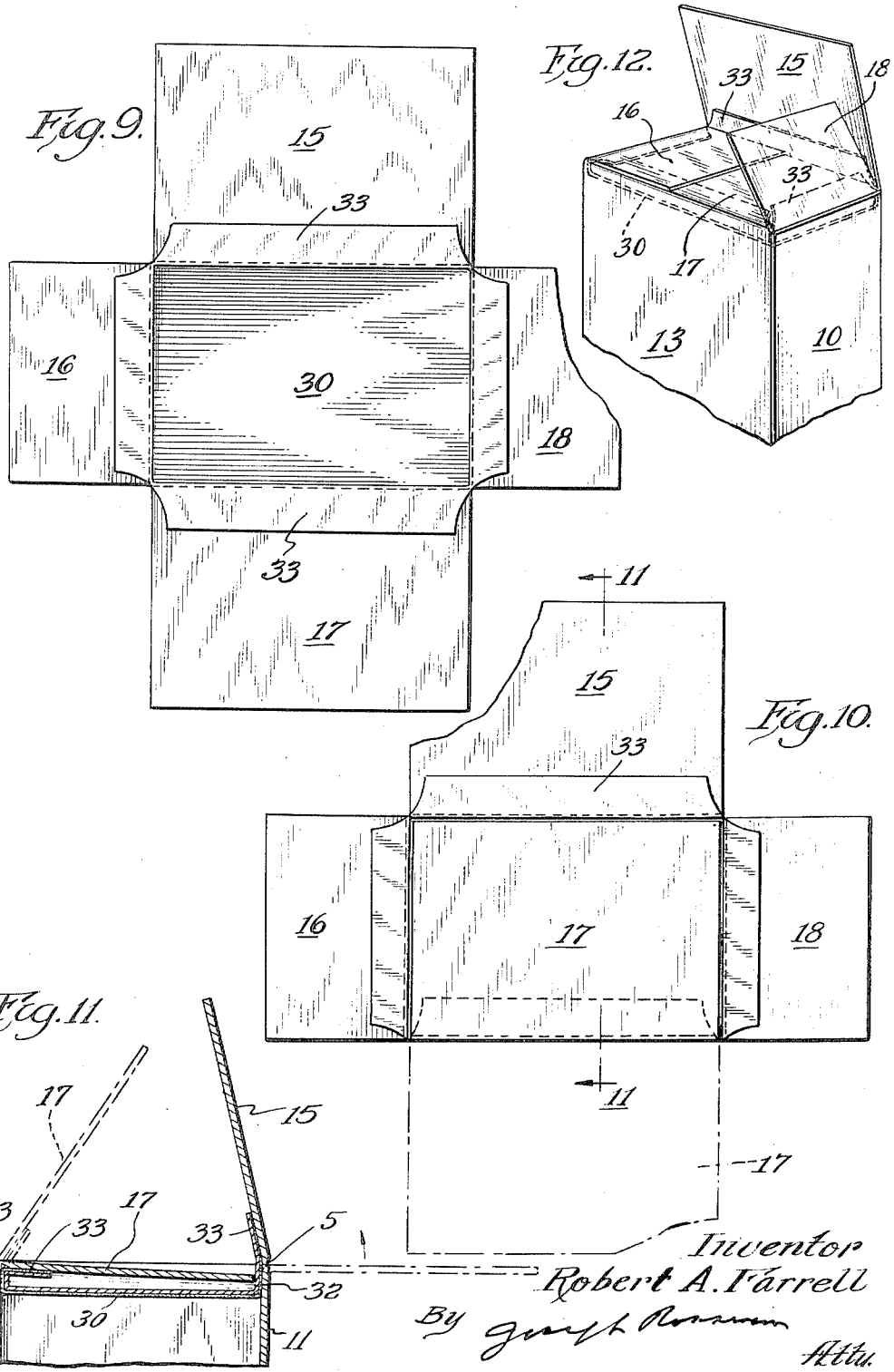

Jan. 31, 1950
R. A. FARRELL
2,496,043
LEAKPROOF PACKAGE AND METHOD OF MAKING SAME
Filed July 26, 1946
6 Sheets-Sheet 4
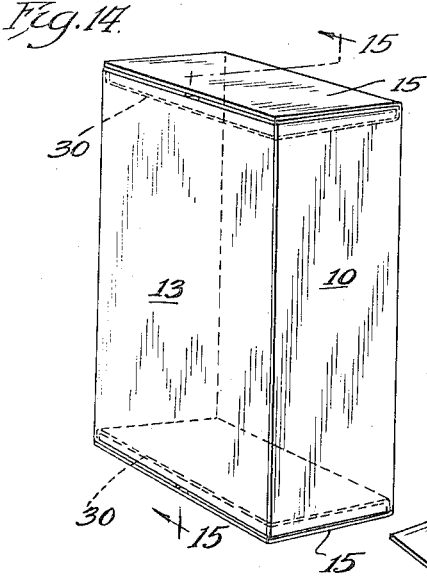
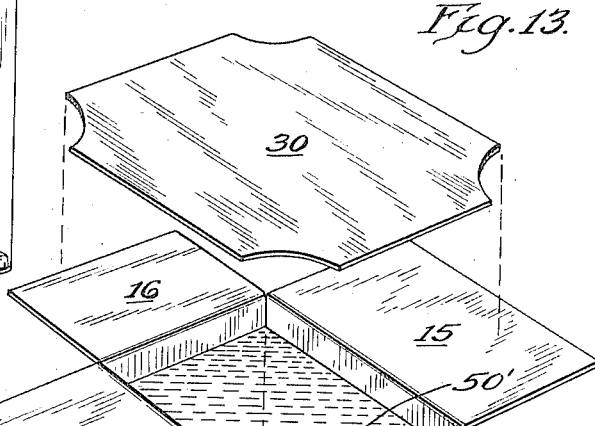
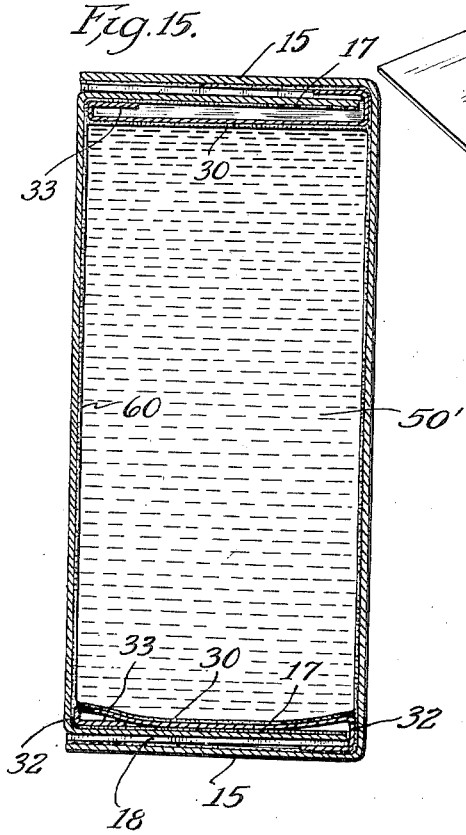
Inventor
Robert A. Farrell
By Joseph Rossman
Atty.

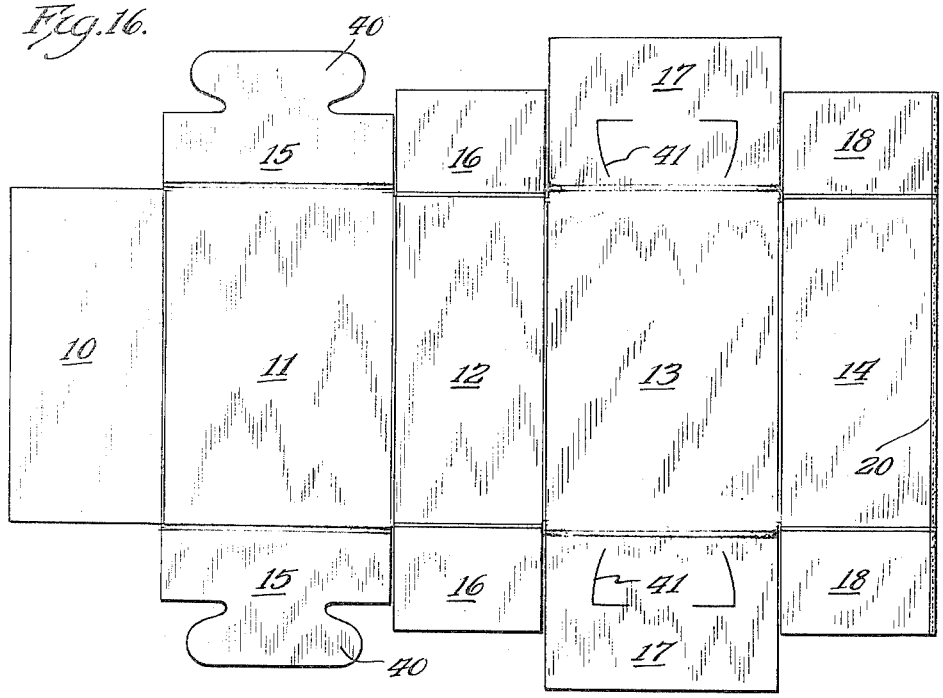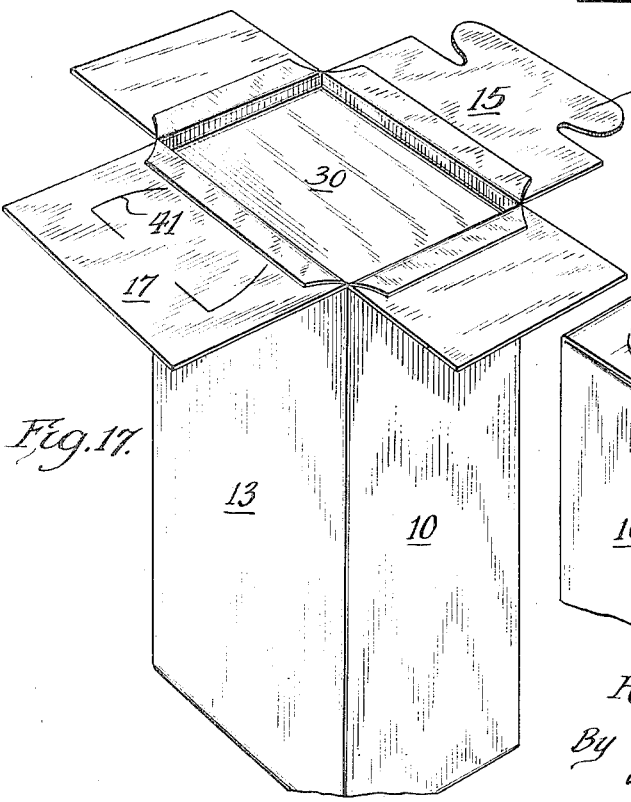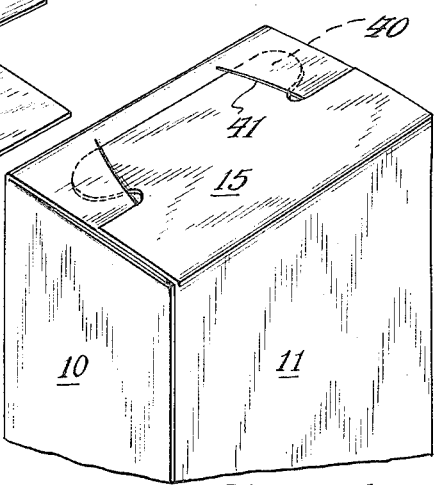

Jan. 31, 1950 R. A. FARRELL 2,496,043
LEAKPROOF PACKAGE AND METHOD OF MAKING SAME
Filed July 26, 1946 6 Sheets-Sheet 6

Inventor
Robert A. Farrell

Patented Jan. 31, 1950

2,496,043

UNITED STATES PATENT OFFICE 2,496,043

LEAKPROOF PACKAGE AND METHOD OF MAKING SAME

Robert A. Farrell, Menasha, Wis., assignor to Marathon Corporation, Rothschild, Wis., a corporation of Wisconsin Application July 26, 1946, Serial No. 686,537

13 Claims. (Cl. 229—5.5)

This invention relates to a leakproof and siftproof package and the method of making same. More specifically this invention relates to a package made from folding or tubular cartons having the open ends thereof sealed with a flexible closure membrane or sheet material.

Hitherto many attempts have been made to provide leakproof and siftproof containers and packages made of cardboard and the like for packaging fluids, such as milk, or powders, such as dried milk, powdered sugar and the like. Difficulties have been encountered in producing such packages in utilizing cartons of conventional construction because it was impossible to form closures which would remain tight and liquidproof throughout. Numerous constructions of the carton itself have been proposed in order to obviate these difficulties but the cost of such cartons has been prohibitive or the construction of the cartons was so complicated as not to be practicable for commercial production. Other attempts have been made to provide leakproof packages by use of an internal flexible bag or container made of such materials as rubber hydrochloride films (Pliofilm) and the like, which were heat-sealed at the closures. It has been found that the cost of such inner containers is very high and furthermore many difficulties have been encountered in the commercial assembly of this type of package.

The present invention provides a very successful and economical solution to the difficulties previously mentioned, and makes it possible to produce very satisfactory leakproof and siftproof packages by mechanical equipment at extremely low cost as compared with other forms of unit containers.

Figure 19:
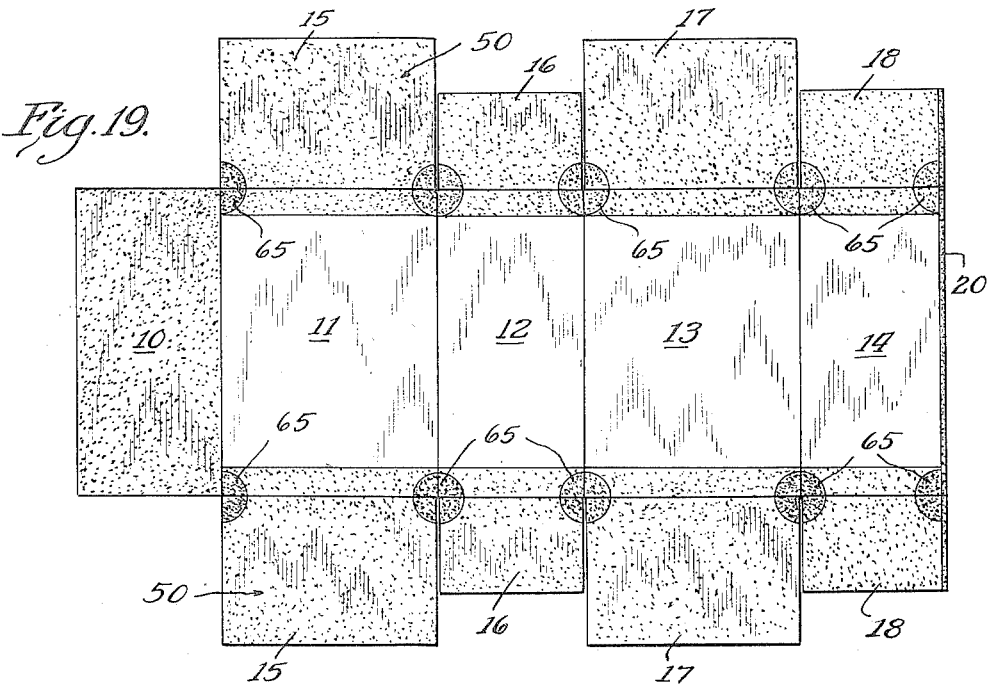
Figure 20:
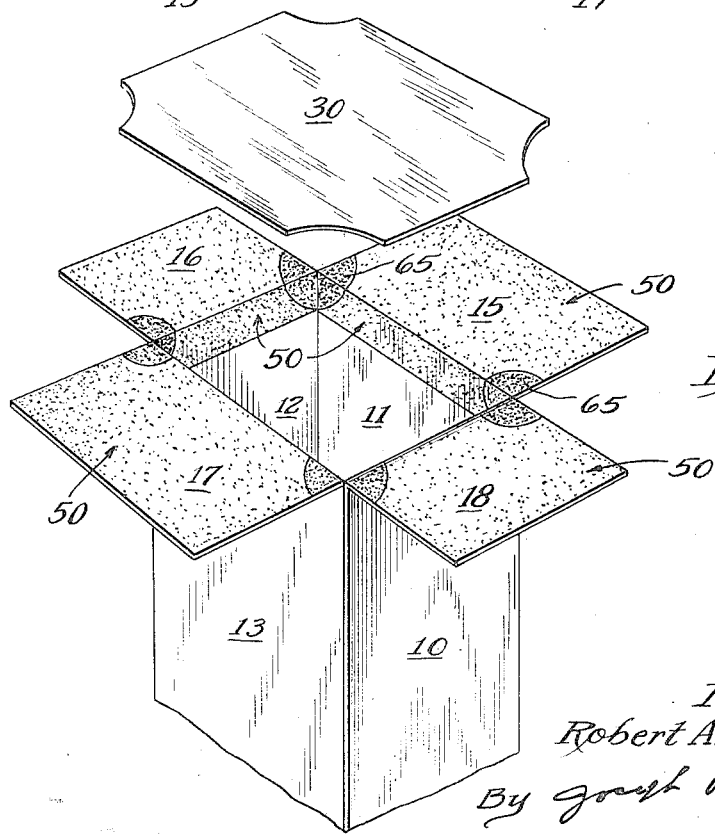

Further objects and advantages of the invention will be apparent from the following specification and drawings wherein:

Figure 1 is a plan view of a blank suitably cut and scored for forming a tubular container or carton, Figure 2 is a perspective view of the container formed from the blank shown in Figure 1, Figure 3 is an enlarged sectional view taken on lines 3—3 of Figure 1, Figure 4 is an enlarged sectional view taken on lines 4—4 of Figure 2, Figure 5 is a perspective view of a flexible closure membrane for sealing the ends of the container, Figure 5a is a similar view of the closure membrane as seen from the reverse side, Figure 6 is a fragmental perspective view of the tubular container having applied and sealed thereto the flexible closure membrane at one end thereof, Figure 7 is a sectional view taken on lines 7—7 of Figure 6, Figure 8 is a sectional view taken on lines 8—8 of Figure 7, Figure 9 is a plan view of the container with the flexible closure membrane in sealed condition, Figure 10 is a similar view illustrating the first step in folding the inner closure flap over the closure membrane, Figure 11 is a sectional view taken on lines 11—11 of Figure 10, Figure 12 is a perspective fragmental view of the container showing the further steps of folding over the closure flaps, Figure 13 is a perspective view of the container filled with a liquid prior to sealing the open end thereof, Figure 14 is a perspective view of the filled and completed package, Figure 15 is a sectional view taken on lines 15—15 of Figure 14, Figure 16 is a plan view of a blank suitably cut and scored for forming a modified carton construction, Figure 17 is a persective view of the carton formed from the blank shown in Figure 16 having the end thereof sealed with a flexible closure membrane, Figure 18 is a fragmental perspective view of the completed carton having the end flaps in closed condition, Figure 19 is a plan view of the modified blank provided with predetermined adhesive areas, and Figure 20 is a fragmental perspective view of a carton formed from the blank shown in Figure 19 prior to sealing the end thereof with a closure membrane.

Referring to the drawings, the present invention is applicable to any conventional type of carton such as a folding or polygonal tubular type of carton having open ends and closure flaps as shown in Figure 2, which is formed from the blank shown in Figure 1. The blank is formed from any suitable carton stock having a caliper say of 0.018 in. suitably cut and scored along score lines 1, 2, 3, 4, 5, 6, 7 and 8, to provide a front wall 11, a rear wall 13, side wall 12 and overlapping side walls 10 and 14, side wall 10 being overlapped and adhered by means of adhesive 19 to side wall 14. Front wall 11 is provided with hinged closure flaps 15 at each end thereof. Rear wall 13 is provided with hinged closure flaps 17 at each end thereof. End wall 12 is provided with hinged closure flaps 16 and end wall 14 is provided with hinged closure flaps 18 at each end thereof.

The free cut edge portion of end wall 14 may be treated with a greaseproof and moistureproofing composition 20 which may be applied in any suitable manner to the blank by means of brushes or rollers, or by dipping the edge of the blank in the composition. The purpose of the composition 20 is to serve as a barrier against wicking by the carton stock of any oily or greasy substances packaged therein as well as any moisture.

The tubular container is set up in any suitable manner manually or by equipment, and one end thereof is then completely sealed by a flexible membrane 30 as illustrated in Figures 5 and 5a. The membrane is substantially rectangular in shape and of suitable dimensions so as to fully close the open end of the container, as well as to partially overlap over the closure flaps as shown in Figure 6. The membrane is preferably cut out at the corners 31 so that no free portions of the membrane extend between the flaps, and this also facilitates mechanical feeding when the membranes are used in roll form. The membrane may be formed of any suitable flexible sheet material such as paper, say 25-lb. basis wet-strength bleached kraft having applied to one face thereof the coating 35, say of a 20-lb. basis weight of a composition consisting of 85% by weight of microcrystalline wax and 15% by weight of isobutylene polymer and having a viscosity when applied of not less than about 10,000 centipoises at 90° C. The membrane may also be formed of any other suitable self-sustaining sheet materials suitably coated such as cellophane (regenerated cellulose), ethyl cellulose, cellulose acetate and the like. The membrane may also be formed of self-sustaining thermoplastic films such as rubber hydrochloride (Pliofilm), wax-rubber films (Paraffin Patent No. 2,054,115), vinylidene chloride films, films of copolymers of vinyl acetate and vinyl chloride, films of vinyl chloride and the like. The coating 35 on the membrane may also be formed of any suitable substance or composition depending upon the specific materials to be packaged, and requirements of waterproofness, moistureproofness, greaseproofness and the like. The coating, for example, may be made of a rubber and wax composition as disclosed in Patent No. 2,054,115, microcrystalline wax, and aluminum stearate compositions of the type disclosed in Patent No. 2,348,687, polyamid resins, ethyl cellulose, rubber hydrochloride, etc. The flexible membrane 30 is positioned in flat condition over the open end of the carton and then shaped in situ by any suitable means such as an expansible head which will shape or form the membrane without rupturing same and depress the marginal portions 32 thereof and bring them into contact with the inner perimeter of the open end of the carton slightly below the upper edge thereof and below the score lines upon which the respective closure flaps 16, 15, 17 and 18 are hinged. The flexible membrane 30 is applied so as to present the coating 35 thereon to the inner face of the carton and the closure flaps. The walls and flaps of the carton are rigidly supported by any suitable means and heat and pressure are applied to the membrane so as to seal or adhere the marginal portions 33 thereof to the closure flaps in contact therewith, as well as the depressed portions 32 to the inner faces of the side walls of the carton. A suitable applying means may be used, such as an expanding head so as to apply sufficient pressure not only at the depressed portions 32 of the membrane, but also at each of the corners of the carton where leakage is more likely to occur when liquid contents are placed in the carton. The flexible membrane 30 is preferably heat-sealed by application of suitable heat and pressure to the flaps and corners of the carton while the flaps and corners are rigidly supported. The flexible membrane 30 of suitable contour and dimensions is thus merely depressed around the entire end opening of the carton by uniform manipulation of the membrane so as to eliminate any wrinkling or buckling. In actual practice I find that the membrane should not be depressed more than about 3/16 inch inwardly of the open end in order to avoid gathering or puckering of the membrane adjacent the flaps which might cause an imperfect closure seal.

In view of the fact that the membrane 30 is flexible, normal manufacturing variations in the dimensions of the perimeter of the carton opening resulting from gluing and other forming operations or variations in the location of the side seam are avoided. The membrane 30 is preferably not provided with any predetermined score lines, but it can be readily shaped, formed, and depressed within the end of the carton and readily applied by heat and pressure to the inner surfaces of the carton walls and flaps as previously explained. In effect each sealing membrane is shaped and formed in situ just prior to sealing operation using the end of the container as a die or former so that the individual membrane will be given the exact complemental contour and dimensions of the inner perimetric opening adjacent the open end of the container. Thus a perfect seal is ensured as each portion of the membrane in contact with the inner surfaces of the container will be in snug contact without any subsequent tension or pull acting normally to separate the membrane from the contacting areas. Thus even though slight variations in the dimensions and contour may occur in the open end of each container in normal manufacturing operations the sealing membrane applied to each container is formed or shaped to the precise contour of each slight variation of the container end dimension and contour that may be present in the particular individual container being sealed. The closure membrane, formed either of a self-sustaining thermoplastic film or of a sheet material provided with a thermoplastic coating of suitable thickness, will provide a hermetic seal at the ends of the container when sealed into position in the manner previously described by heat and pressure. It is preferred to use a sealing temperature as near as possible to the melting point of the thermoplastic film or coating to minimize dissipation or absorption of the sealing medium into the side walls and flaps of the container. This provides a maximum viscosity or consistency of the thermoplastic substance of the membrane when the seal is formed thus ensuring a complete closure even though variations may occur in the perimetric contour and dimensions of the open end of the container which normally occur in commercial containers. It is also important to select a membrane which has adequate bursting strength and stretch so as to withstand mechanical strains when the membrane is deformed during sealing operations. The membrane should also retain its flexibility and strength in the final sealed package. When the membrane is formed of coated sheet materials it is also important to select the components of such coated sheets to ensure anchorage of the coating so that it will not separate or loosen from the base sheet when exposed to the materials within the package.

When the sealing membrane is shaped and sealed into the end of the carton in the manner described it will have a slight slack and yield sufficiently under the pressure of the contents as shown in Figure 14 without loosening any of the seams or sealed areas of the membrane, thus ensuring a leakproof seal. It will be noted that the membrane is sealed to the inner surface of the carton around the entire periphery 32 just below the open end of the carton as well as at the adjacent areas 33 of the closure flaps. The sealing of the membrane at these two regions thus ensures a perfect hermetic seal at the end of the carton. In the event of any accidental loosening of the seal at the area 32 the sealed area in the adjacent region 33 of the flaps will thus serve as a secondary safety seal.

After the membrane is sealed in position as shown in Figures 6 to 9, the closure flap 17 is folded over the membrane 30 as illustrated in Figure 10 and then flaps 16 and 18 are folded thereover. The outer closure flap 15 is then folded and glued or sealed to the flaps therebeneath as shown in Figure 12. The carton is then filled with any suitable liquid 50', or other material to be packaged and the open end thereof is sealed with another flexible membrane 30 in the manner previously described so as to produce the completed package shown in Figures 14 and 15. Such package is leakproof, very strong, and will withstand considerable abuse in handling without developing any leakage.

The carton may be formed from any suitable material depending upon the type of materials to be packaged therein. The carton may be lined, for example, with greaseproof paper, wet-strength paper, wax paper, metal foil, rubber hydrochloride, regenerated cellulose and the like. The inner face of the carton may also be provided, if desired, with any suitable types of thermoplastic heat-sealable coatings. It may be treated with greaseproof and moistureproofing agents. In the event the carton is used for packaging powders it may not be necessary to treat the inner face of the carton at all where siftproofness is merely required.

The invention is not restricted to the use of any particular type of carton construction and may be applied to any open ended type of cartons or containers. For example, a modified carton construction is shown in Figures 16 to 18 wherein the outer closure flaps 15 and 17 are provided with locking tongues and slits 41 for permitting re-closure of the package after the membrane 30 has been punctured or torn away for removing some of the contents from the package. The sealing membrane might be punctured with small holes by the user to permit sifting or shaking of powders or granular materials from the package. Instructions to such effect could be printed on the flaps or membrane itself.

The inner face of the carton may be provided with coatings at specific areas as illustrated in Figures 19 and 20. For example, the closure flaps may be provided with a heat-sealable coating composition so as to permit heat-sealing of superimposed and folded flaps in the completed package. If desired, additional areas or thick coatings of thermoplastic composition 65 may be applied at the corners of the container so as to ensure positive sealing of the flexible membrane 30 at this region by providing additional sealing means to such areas.

The sequence of closing the end flaps of the carton may be varied in any desired manner. It is preferred, however, to utilize an inner closure flap such as the flap 17 shown in Figures 1 to 11 of such dimension and contour that this flap will completely close the open end of the container and have its free edges contact the adjacent walls of the carton. By utilizing such flap construction the membrane 30 therebeneath is protected against accidental shock or impact so that the danger of loosening the membrane is minimized. The respective positions of the score lines or hinge lines of the closure flaps are preferably located in successively stepped or offset relation in the same sequence or order as the closure flaps are successively to be folded. For example, as shown in Figure 1, score line 7 is lower than score lines 6 and 8, and score lines 6 and 8 are lower than score line 5. It will thus be seen when the closure flap 17 is folded over it will fit snugly against the membrane 30 just below score line 5, as shown in Figure 11 and thus help to hold the flexible membrane 30 in proper position and avoid strain on that portion of the package. The closure flaps in final closed position will thus not exert any undue pressure upon the membrane therebeneath and will also minimize impact effects on the membrane itself.

One of the important features of the present invention resides in providing and positioning the flexible membrane so that it will contact and be sealed at the corners of the carton as well as below the score lines 5, 6, 7, and 8 on which the closure flaps are hinged. By providing a complete seal below the score line at each end of the carton a perfect seal is provided so that no leakage can occur. All the components of the package, that is the carton and the membranes, can be shipped in knocked-down or flat condition to the user, so that shipping costs are reduced to a minimum. The package can be readily formed by automatic, semi-automatic, or hand equipment. All that is necessary is to set up the tubular container, and to seal the flexible membrane at one end thereof in the manner previously explained, after which the closure flaps are folded and glued together. The carton can then be filled with any material desired to be packaged and the open end thereof is then sealed with another flexible membrane in the same manner as previously described and the closure flaps are then folded and glued or sealed to form the completed package.

Obviously numerous modifications and the essential features of this invention may be made in the package as well as in the mode of making same. It is intended to include such modifications within the scope of the appended claims.

I claim:

1. A package comprising a polygonal tubular container having open ends, end flaps for closing said ends and a flexible closure membrane extending entirely across the ends of said container and sealed thereto, said membranes being depressed adjacent the open end of the said container and adhered to the inner wall portions thereof adjacent the open ends thereof for providing a leakproof closure, and said end flaps being folded over said closure membranes.

2. A package comprising a container having an open end, end flaps for closing said end and a flexible closure membrane provided with a heat-sealable coating thereon and extending entirely across the end of said container and heat-sealed thereto, said membrane being depressed adjacent the open end of the said container and adhered to the inner wall portions thereof adjacent the open end thereof for providing a leakproof closure, and said end flaps being folded over said closure membrane.

3. A package having an open end, closure flaps hinged along score lines at said open end, a flexible closure membrane sealing said open end, said membrane being adhered to portions of the closure flaps adjacent said open end and to portions of the container wall adjacent to and below said score lines and a depressed portion of said membrane being positioned inwardly of the open end of said container.

4. A package formed from a carton having an open end, closure flaps hinged along score lines at said open end, a flexible closure membrane sealing said open end, said closure membrane being shaped to precisely fit the contour and dimensions of the inner perimetric opening adjacent said open end of the container, said membrane being adhered to portions of the closure flaps adjacent said open end and to portions of the container wall adjacent to and below said score lines and a depressed portion of said membrane being positioned inwardly of the open end of said container.

5. The method of making a leakproof package which comprises the steps of providing a polygonal tubular container having end flaps hinged at one open end thereof, supporting said flaps in extended position, applying a flexible membrane of dimensions and contour to extend entirely across the end of said container and overlapping portions of the extended flaps adjacent said opening, depressing said membrane so as to position same within the container spaced a relatively short distance from the open end thereof and applying heat and pressure to the areas of the membrane in contact with the carton walls and flaps to completely seal the end of the container.

6. The method of making a leakproof package which comprises the steps of providing a polygonal tubular container having end flaps hinged at one open end thereof, supporting said flaps in extended position, applying a flexible membrane of dimensions and contour to extend entirely across the end of said container and overlapping portions of the extended flaps adjacent said opening, shaping said membrane in situ to precisely fit the contour and dimensions of the inner perimetric opening adjacent said open end and simultaneously depressing said membrane so as to position same within the container spaced a relatively short distance from the open end thereof and applying heat and pressure to the areas of the membrane in contact with the carton walls and flaps to completely seal the end of the container.

7. The method of making a leakproof package which comprises the steps of providing an open ended polygonal tubular container, applying a flexible closure membrane to one end of said container and adhering same to the inner face of said container adjacent the open end thereof, depressing said membrane within the open end of the container in sealed relation thereto, filling said container with material to be packaged therein, applying a flexible membrane to the open end of said container and adhering same to the inner face of said container adjacent the open end thereof and depressing said membrane within the open end of the container in sealed relation thereto to complete the package.

8. The method of making a leakproof package which comprises the steps of providing an open ended polygonal tubular container, applying a flexible closure membrane to one end of said container, shaping said membrane in situ to precisely fit the contour and dimensions of the inner perimetric opening adjacent said open end and simultaneously depressing said membrane within the open end of the container in sealed relation thereto, filling said container with material to be packaged therein, applying a flexible membrane to the open end of said container, shaping said membrane in situ to precisely fit the contour and dimensions of the inner perimetric opening adjacent said open end and simultaneously depressing said membrane within the open end of the container in sealed relation thereto.

9. The method of making a leakproof package which comprises the steps of providing an open ended polygonal tubular container, applying a flexible closure membrane to one end of said container, shaping said membrane in situ to precisely fit the contour and dimensions of the inner perimetric opening adjacent said open end and simultaneously depressing said membrane within the open end of the container in snug relation thereto, and adhering same to the inner face of said container adjacent the open end thereof, filling said container with material to be packaged therein applying a flexible membrane to the open end of said container, shaping said membrane in situ to precisely fit the contour and dimensions of the inner perimetric opening adjacent said open end and simultaneously depressing said membrane within the open end of the container in snug relation thereto and adhering same to the inner face of said container adjacent the open end thereof.

10. A carton comprising a polygonal tubular body and closure members at each end thereof, at least one closure member including a single flat flexible sheet extending transversely of one end of the body portion and having a continuous upturned edge secured to the inner walls of said body portion by a continuous film of adhesive, and a flap hinged along one edge of said body portion and adapted to lie in juxtaposition to said flat sheet.

11. A carton comprising a polygonal tubular body and closure members at each end thereof, at least one closure member including a single flat flexible sheet extending transversely of one end of the body portion and having a continuous upturned edge secured to the inner walls of said body portion by a continuous film of adhesive, a flap hinged along one edge of said body portion and adapted to lie in juxtaposition to said flat sheet, and an extension of a portion of said upturned edge adhesively secured to said flap.

12. A carton comprising a polygonal tubular body and closure members at each end thereof, at least one closure member including a single flat flexible sheet extending transversely of one end of the body portion and having a continuous upturned edge secured to the inner walls of said body portion by a continuous film of adhesive, and a plurality of flaps hinged along the edges of said body portion and adapted to lie in juxtaposition to said flat sheet when in closed position so as to support said flat sheet against excessive bulging when the carton is filled.

13. A carton comprising a polygonal tubular body and a closure member at an end thereof, said closure member including a single flat flexible sheet extending transversely of the same end of the body portion and having a continuous upturned edge secured to the inner walls of said body portion by a continuous film of adhesive, and a flap hinged along one edge of said body portion and adapted to lie in juxtaposition to said flat sheet.

ROBERT A. FARRELL.

REFERENCES CITED

The following references are of record in the file of this patent:

UNITED STATES PATENTS

| Number | Name | Date |
|---|---|---|
| 368,819 | Diemer | Aug. 23, 1887 |
| 918,138 | Flora | Apr. 13, 1909 |
| 927,801 | Jenkins | July 13, 1909 |
| 1,806,943 | Koch et al. | May 26, 1931 |
| 2,166,389 | Bergstein | July 18, 1939 |
| 2,220,388 | Beaman et al. | Nov. 5, 1940 |
| 2,381,508 | Moore | Aug. 7, 1945 |
| 2,382,573 | Moore | Aug. 14, 1945 |
| 2,416,332 | Lehman | Feb. 25, 1947 |

FOREIGN PATENTS

| Number | Country | Date |
|---|---|---|
| 12,070 | Great Britain | 1915 |